(12) United States Patent
Itou

(10) Patent No.: US 9,616,774 B2
(45) Date of Patent: Apr. 11, 2017

(54) VEHICLE SEAT CONTROLLER

(71) Applicant: ASMO CO., Ltd., Shizuoka-ken (JP)

(72) Inventor: Hirotaka Itou, Toyohashi (JP)

(73) Assignee: ASMO CO., LTD., Shizuoka-ken (JP)

( * ) Notice: Subject to any disclaimer, the term of this patent is extended or adjusted under 35 U.S.C. 154(b) by 0 days.

(21) Appl. No.: 14/975,417

(22) Filed: Dec. 18, 2015

(65) Prior Publication Data

US 2016/0185259 A1 Jun. 30, 2016

(30) Foreign Application Priority Data

Dec. 26, 2014 (JP) ................ 2014-265156

(51) Int. Cl.
| | |
|---|---|
| *H02P 6/06* | (2006.01) |
| *B60N 2/02* | (2006.01) |
| *B60N 2/22* | (2006.01) |
| *B60N 2/06* | (2006.01) |
| *B60N 2/16* | (2006.01) |

(52) U.S. Cl.
CPC ......... *B60N 2/0232* (2013.01); *B60N 2/0244* (2013.01); *B60N 2/06* (2013.01); *B60N 2/16* (2013.01); *B60N 2/22* (2013.01)

(58) Field of Classification Search
CPC ...... H02P 3/00; H02P 5/00; H02P 5/46; H02P 6/00; H02P 6/04; H02P 6/06; H02P 7/00; H02P 8/00; H02P 8/30; H02P 25/00; H02P 25/06; H02P 25/08; H02P 25/10; H02P 25/12; B60N 2/0232; B60N 2/22; B60N 2/06
USPC .... 318/400.01, 400.03, 400.14, 400.15, 266, 318/280, 286, 466, 700, 701, 721, 727, 318/779, 799, 800, 801, 599, 811; 49/43, 49/72, 100, 146, 380, 467
See application file for complete search history.

(56) References Cited

U.S. PATENT DOCUMENTS

| | | | |
|---|---|---|---|
| 8,214,109 B2 | 7/2012 | Schüssler et al. | |
| 8,456,121 B2 * | 6/2013 | Yuasa ................. | B60N 2/0232 318/266 |

(Continued)

FOREIGN PATENT DOCUMENTS

| | | |
|---|---|---|
| JP | 2002065388 A | 3/2002 |
| JP | 2009526694 A | 7/2009 |

(Continued)

*Primary Examiner* — Antony M Paul
(74) *Attorney, Agent, or Firm* — Patterson Thuente Pedersen, P.A.

(57) ABSTRACT

A vehicle seat controller includes a feedback controller, a speed instruction value setting unit, and an entrapment determination unit. The feedback controller performs speed feedback control so that a rotation speed of the motor follows a speed instruction value based on a difference of the speed instruction value and an actual speed of the rotation speed of the motor. The speed instruction value setting unit sets the speed instruction value in accordance with a position of the vehicle seat. The entrapment determination unit determines entrapment of a foreign object entrapped by the vehicle seat when the vehicle seat is motor-driven. When the entrapment determination unit makes a foreign object entrapment determination, the speed instruction value setting unit changes the speed instruction value for an entrapment position of the vehicle seat to a low speed value that is smaller than a predetermined initial value.

6 Claims, 3 Drawing Sheets

(56) References Cited

U.S. PATENT DOCUMENTS

| 9,018,869 B2 | 4/2015 | Yuasa et al. |
| 2009/0055055 A1 | 2/2009 | Schussler et al. |
| 2011/0043157 A1 | 2/2011 | Yuasa et al. |
| 2011/0043158 A1 | 2/2011 | Yuasa et al. |

FOREIGN PATENT DOCUMENTS

| JP | 2011045203 A | 3/2011 |
| JP | 2011045204 A | 3/2011 |

* cited by examiner

⋮

VEHICLE SEAT CONTROLLER

BACKGROUND OF THE INVENTION

The present invention relates to a vehicle seat controller.

There is a conventional motor-driven vehicle seat that can be powered by a motor to tilt a seatback and move a seat cushion toward the front or rear (refer to, for example, Japanese Laid-Open Patent Publication No. 2002-65388). The power of the motor is transmitted to the seatback and the seat cushion via a reduction drive or the like, which is incorporated in the seat, to motor-drive the seatback and the seat cushion.

When the motor-driven vehicle seat is motor-driven and moved, a foreign object may be entrapped between the vehicle seat and a rear seat. In such a case, an unexpected load is applied to the foreign object and the vehicle seat. Thus, it is desirable that such a load be reduced.

SUMMARY OF THE INVENTION

It is an object of the present invention to provide a vehicle seat controller that is capable of reducing the load that is applied when entrapping a foreign object.

To achieve the above object, a vehicle seat controller according to one aspect of the present invention controls motor-driving of a vehicle seat based on rotation force of a motor. The vehicle seat controller includes a feedback controller, a speed instruction value setting unit, and an entrapment determination unit. The feedback controller performs speed feedback control so that a rotation speed of the motor follows a speed instruction value based on a difference of the speed instruction value and an actual speed of the rotation speed of the motor. The speed instruction value setting unit sets the speed instruction value in accordance with a position of the vehicle seat. The entrapment determination unit determines entrapment of a foreign object entrapped by the vehicle seat when the vehicle seat is motor-driven. When the entrapment determination unit makes a foreign object entrapment determination, the speed instruction value setting unit changes the speed instruction value for an entrapment position of the vehicle seat to a low speed value that is smaller than a predetermined initial value.

A vehicle seat controller according to another aspect of the present invention controls motor-driving of a vehicle seat based on rotation force of a motor. The vehicle seat controller includes a feedback controller, an entrapment determination unit, and a threshold value changing unit. The feedback controller performs speed feedback control so that a rotation speed of the motor follows a speed instruction value based on a difference of the speed instruction value and an actual speed of the rotation speed of the motor. The entrapment determination unit determines entrapment of a foreign object entrapped by the vehicle seat when the vehicle seat is motor-driven based on a threshold value. The threshold value changing unit changes the threshold value to make a stricter determination than when using a predetermined initial value for a section including an entrapment position of the vehicle seat where the entrapment determination unit made a foreign object entrapment determination.

DETAILED DESCRIPTION OF THE PREFERRED EMBODIMENTS

One embodiment of a vehicle seat controller will now be described.

Figure 1:
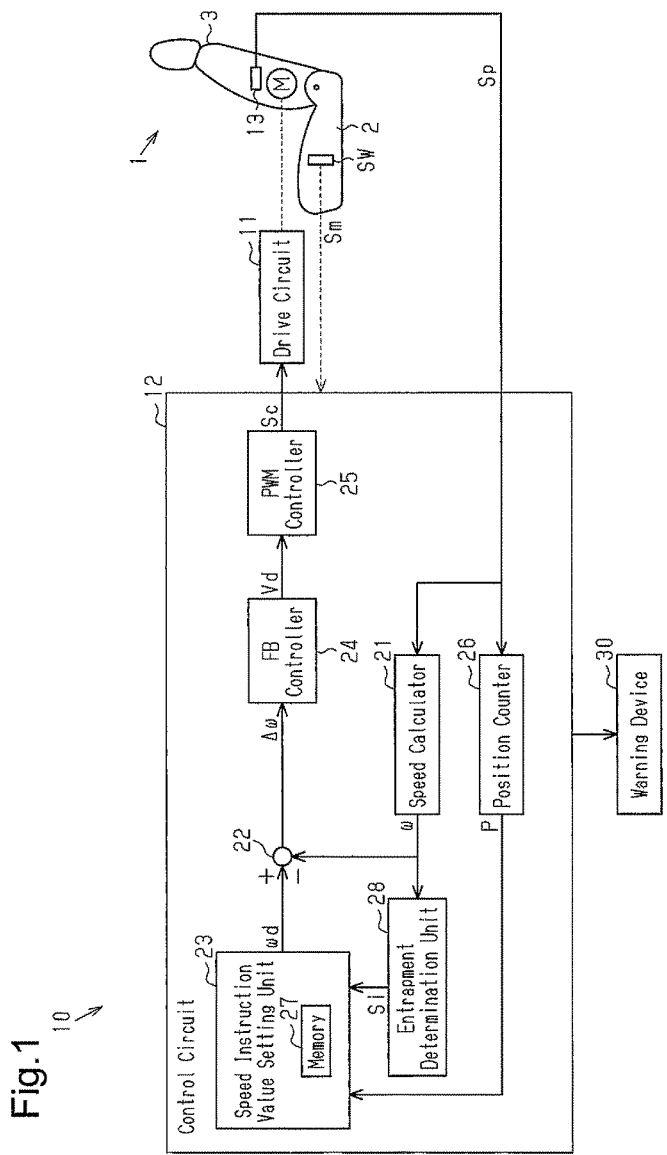
FIG. 1 is an electrical block diagram showing a vehicle seat controller according to one embodiment of the present invention.

As shown in FIG. 1, a vehicle seat 1 includes a seat cushion 2, a seatback 3, and a motor M. The seat cushion 2 serves as a seat. The seatback 3 is arranged on a rear end of the seat cushion 2 in a tiltable manner. The motor M serves as a drive source for tilting and driving the seatback 3. The motor M includes a brushed motor having a power supply brush (not shown) and a rectifier (not shown). Rotation produced by the motor is converted into a tilting action of the seatback 3 by a reduction drive (not shown) of the vehicle seat 1. A vehicle seat controller 10 of the present embodiment controls the rotation and driving of the motor M to control the tilting of the seatback 3. The reduction drive is a known mechanism that includes internal gears (not shown) and external gears (not shown), which mesh with the internal gears while eccentrically moving relative to the internal gears.

The vehicle seat controller 10 includes a drive circuit 11, a control circuit 12, a rotation sensor 13, and an operation switch SW. The drive circuit 11 supplies drive electric power to the motor M. The control circuit 12 controls the driving of the motor M via the drive circuit 11. The rotation sensor 13 detects rotation produced by the motor M. The operation switch SW is arranged on, for example, one side surface of the seat cushion 2. When the operation switch SW is operated by a vehicle occupant, an operation signal Sm is output from the operation switch SW to the control circuit 12. The control circuit 12 drives the motor M via the drive circuit 11 when receiving the operation signal Sm to tilt the seatback 3.

The rotation sensor 13, which is formed by a Hall IC attached to the motor M, outputs a rotation detection signal Sp (pulse signal) in accordance with the rotation of the motor M. The control circuit 12 generates a control signal Sc (PWM drive signal) based on the rotation detection signal Sp that is output from the rotation sensor 13. The control circuit 12 outputs the rotation detection signal Sp to the drive circuit 11 to PWM-drive the drive circuit 11 and control the driving of the motor M.

The control circuit 12 includes a speed calculator 21, a subtractor 22, a speed instruction value setting unit 23, a feedback controller 24 (FB controller), a PWM controller 25, a position counter 26, and an entrapment determination unit 28.

The speed calculator 21 calculates a rotation speed detection value $\omega$ based on the rotation detection signal Sp that is output from the rotation sensor 13. The subtractor 22 calculates the difference of a speed instruction value $\omega d$, which is output from the speed instruction value setting unit 23, and the rotation speed detection value $\omega$ (actual speed), which is calculated by the speed calculator 21. The subtractor 22 outputs the calculated speed deviation $\Delta\omega$ (speed deviation $\Delta\omega = \omega d - \omega$) to the FB controller 24.

The feedback controller 24 performs speed feedback control based on the speed deviation $\Delta\omega$. In the present embodiment, the speed feedback control performed by the FB controller 24 is PI control. That is, the FB controller 24 multiplies the speed deviation $\Delta\omega$ by a proportional gain Kp of P (proportional) control to calculate a proportional component. The FB controller 24 multiplies an integral value of the speed deviation A by an integral gain Ki of I (integral) control to calculate an integral component. The FB controller 24 adds the proportional and integral components to calculate a voltage instruction value Vd and outputs the voltage instruction value Vd to the PWM controller 25.

The PWM controller 25 PWM-drives the drive circuit 11 by calculating a duty instruction value based on the voltage instruction value Vd, generating the control signal Sc having the on-duty ratio indicated by the duty instruction value, and outputting the control signal Sc to the drive circuit 11. This outputs drive electric power that corresponds to the control signal Sc from the drive circuit 11 to the motor M.

The position counter 26 calculates position information P of the seatback 3 based on the rotation detection signal Sp that is output from the rotation sensor 13. The position counter 26 outputs the position information P to the speed instruction value setting unit 23. The position information P of the seatback 3 is, for example, the count of the number of times the rotation detection signal Sp rises and falls. The rotation detection signal Sp corresponds to the angle of the seatback 3.

The speed instruction value setting unit 23 includes a memory 27, which stores speed instruction maps for the position information P of the seatback 3 in advance. When the control circuit 12 receives the control signal Sm from the operation switch SW, the speed instruction value setting unit 23 refers to the speed instruction maps to obtain the speed instruction value ωd that is in accordance with the position information P of the seatback 3 and outputs the speed instruction value ωd to the subtractor 22. The speed instruction maps include a map for tilting the seatback 3 toward the front and a map for tilting the seatback 3 toward the rear.

The entrapment determination unit 28 calculates a speed change amount per unit time of the rotation speed detection value ω that is calculated by the speed calculator 21. The entrapment determination unit 28 compares the speed change amount and a threshold value t. When the speed change amount is greater than or equal to a threshold value t, the entrapment determination unit 28 outputs an entrapment determination signal Si to the speed instruction value setting unit 23. When the entrapment determination unit 28 determines that something is entrapped, the control circuit 12 stops driving the drive circuit 11 with the PWM controller 25 to stop the motor M.

The control modes and operation of the vehicle seat controller 10 in the present embodiment will now be described with reference to FIGS. 2A to 2D. FIGS. 2A to 2D each show a speed instruction map for tilting the seatback 3 toward the rear. In the description hereafter, discussion will be made only on the rearward tilting operation of the seatback 3. The frontward tilting operation and the rearward tilting operation differ only in the rotation direction of the motor M and control is executed in the same manner. Thus, in the description hereafter, frontward tilting will not be described in detail.

Figure 2A:
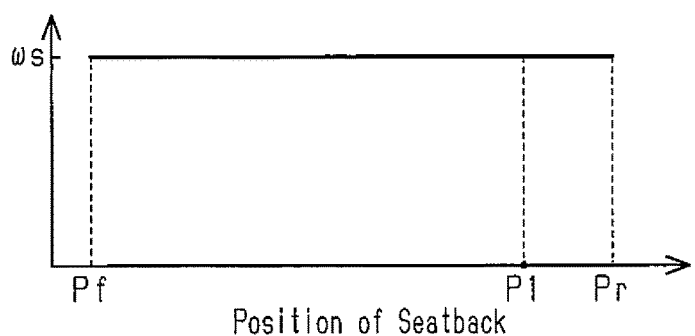
FIGS. 2A to 2D are graphs showing modes for changing a speed instruction map in the configuration of FIG. 1.

FIG. 2A shows an initial speed instruction map stored in the memory 27 in advance. In the initial speed instruction map as shown in FIG. 2A, the speed instruction value ωd remains the same value (initial value ωs) wherever the seatback 3 is located from a front end position Pf to a rear end position Pr. When the control circuit 12 receives the operation signal Sm from the operation switch SW, the speed instruction value setting unit 23 refers to the speed instruction map to obtain the speed instruction value ωd that is in accordance with the position (position information P) of the seatback 3 and outputs the speed instruction value ωd to the subtractor 22. That is, when using the speed instruction map for the initial state, wherever the seatback 3 is located, the speed instruction value setting unit 23 outputs the initial value ωs as the speed instruction value ωd to the subtractor 22 and the feedback controller 24 performs speed feedback control based on the initial value ωs.

When the seatback 3 is tilted toward the rear, that is, when the seatback 3 is tilted toward the rear end position Pr, the seatback 3 may come into contact with a foreign object such as something placed on a rear seat at a certain position (entrapment position P1), in which a foreign object is entrapped between the seatback 3 and the rear seat. In this case, when the entrapment determination unit 28 makes an entrapment determination, the control circuit 12 stops driving the drive circuit 11 with the PWM controller 25 to stop the motor M. Further, the entrapment determination unit 28 outputs the entrapment determination signal Si to the speed instruction value setting unit 23 based on the entrapment determination.

Figure 2B:
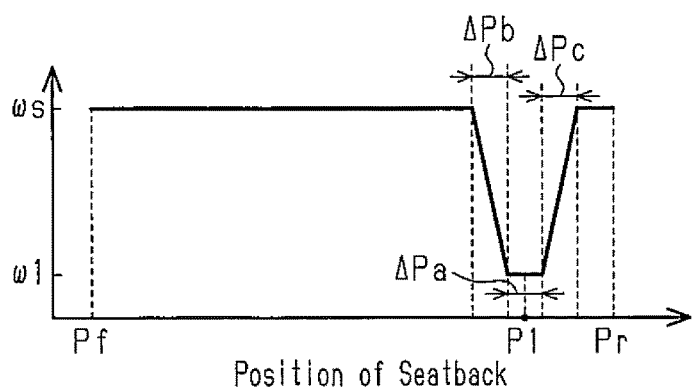

As shown in FIG. 2B, the speed instruction value setting unit 23 rewrites the speed instruction value ωd for a predetermined section (warning section ΔPa) including the entrapment position P1 and the front and rear of the entrapment position P1 in the initial speed instruction map, which is stored in the memory 27, to a first low speed value ω1 that is smaller than the initial value ωs. The section is defined by two certain positions of the seatback. Further, the speed instruction value setting unit 23 rewrites the speed instruction map so that a deceleration section ΔPb and an acceleration section ΔPc are located at the front of and the rear of the warning section ΔPa, respectively. In the deceleration section ΔPb, the speed instruction value ωd decreases from the initial value ωs to a first low speed value ω1 as the seatback 3 moves, for example, in correspondence with a linear function. In the acceleration section ΔPc, the speed instruction value ωd increases from the first low speed value ω1 to the initial value ωs as the seatback 3 moves, for example, in correspondence with a linear function.

After the seatback 3 is stopped at the entrapment position P1 by the entrapment determination of the entrapment determination unit 28 as described above, the vehicle occupant may operate the operating switch SW to tilt the seatback 3 to the front from the entrapment position P1 and then tilt the seatback 3 to the rear again. In this case, when the seatback 3 enters the deceleration section ΔPb, the speed instruction value ωd output from the speed instruction value setting unit 23 gradually decreases from the initial value ωs to the first low speed value ω1 as the seatback 3 moves. That is, the tilting speed of the seatback 3 gradually decreases in the deceleration section ΔPb.

In the warning section ΔPa, which extends from the front to the rear of the entrapment position P1, the first low speed value ω1 is output as the speed instruction value ωd from the speed instruction value setting unit 23 so that the seatback 3 is tilted at a constant low speed by the speed feedback control based on the first low speed value ω1. Thus, when the foreign object still remains in the same state as before, the seatback 3 comes into contact with the foreign object at a low speed. Then, when the entrapment determination unit 28 makes an entrapment determination, the control circuit 12 stops driving the motor M.

When the foreign object is removed and the seatback 3 enters the acceleration section ΔPc via the warning section ΔPa, the speed instruction value ωd output from the speed instruction value setting unit 23 gradually increases from the first low speed value ω1 to the initial value ωs as the seatback 3 moves. That is, the tilting speed of the seatback 3 gradually increases in the acceleration section ΔPc. After the acceleration section ΔPc, the initial value ωs is output as the speed instruction value ωd from the speed instruction value setting unit 23 so that the seatback 3 is tilted at a normal speed by the speed feedback control based on the initial value ωs.

Figure 2C:
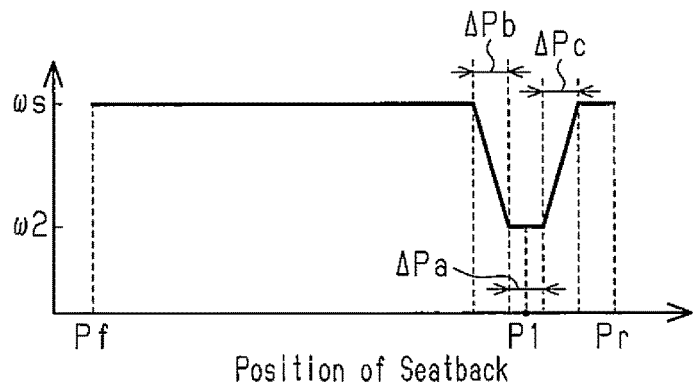

If the operating switch SW is deactivated when the seatback 3 is located at a position closer to the end position Pr than the warning section ΔPa, the speed instruction value setting unit 23 determines whether or not the entrapment determination signal Si has been received from the entrapment determination unit 28 when the seatback 3 passed through the warning section ΔPa. If it is determined that the entrapment determination signal Si has not been received in the warning section ΔPa, the speed instruction value setting unit 23 rewrites the speed instruction value ωd for the warning section ΔPa in the speed instruction map from the first low speed value ω1 to a second low speed value ω2 (ω1<ω2<ωs) as shown in FIG. 2C. Further, the speed instruction value setting unit 23 accordingly changes the degree of increase and decrease (gradient in the present embodiment) in the speed instruction value ωd of the deceleration section ΔPb and the acceleration section ΔPc.

When the seatback 3 is tilted from the entrapment position P1 to the front and then tilted to the rear again, the second low speed value ω2 is output as the speed instruction value ωd from the speed instruction value setting unit 23 in the warning section ΔPa. The seatback 3 is tilted at a constant speed (lower speed than the normal speed) by the speed feedback control based on the second low speed value ω2.

Figure 2D:
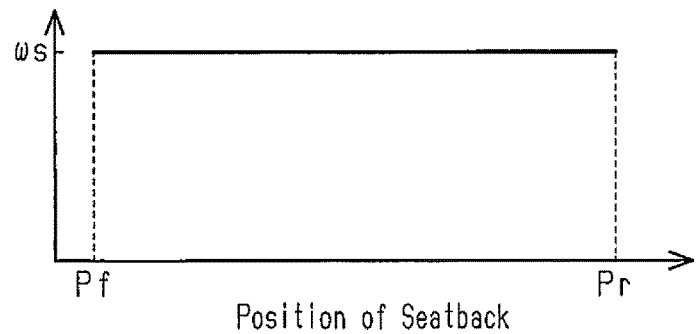

When the speed instruction values ωd for the warning section ΔPa, the deceleration section ΔPb, and the acceleration section ΔPc of the speed instruction map in the above mode is updated to a higher value several times (for example, twice), the speed instruction value ωd of each of the sections ΔPa, ΔPb, and ΔPc is returned to the initial value ωs (refer to FIG. 2D).

When the seatback 3 is moving in the warning section ΔPa, the deceleration section ΔPb, and the acceleration section ΔPc, a notification permission signal is output from the control circuit 12 to a warning device 30. When receiving the notification permission signal, the warning device 30 is activated to notify the vehicle occupant that the movement of the seatback 3 is a foreign object entrapment warning movement (low speed movement). The controller may be configured so that the warning device 30 receives the notification permission signal from a predetermined position located in front of the deceleration section ΔPb to activate the warning device 30 before reaching the deceleration section ΔPb. In such a structure, the vehicle occupant is notified of the movement of the seatback 3 in a preferred manner before switched to the warning operation.

The warning device 30 is, for example, a warning light arranged in the instrument panel of the vehicle or a dome light that is activated when receiving the notification permission signal. Further, the warning device 30 may be a car navigation system that uses a monitor or outputs voice to notify that the movement of the seatback 3 is a foreign object entrapment warning operation.

The present embodiment has the advantages described below.

(1) The speed instruction value setting unit 23 changes the speed instruction value ωd for the entrapment position P1, which is where the entrapment determination unit 28 determines that a foreign object has been entrapped, to the first low speed value ω1 that is smaller than the predetermined initial value ωs. In this manner, the tilting speed of the seatback 3 driven under the speed feedback control is controlled to be reduced at the entrapment position P1. Thus, if the foreign object that resulted in the entrapment determination still exists in the same state as before, the load applied to the foreign object and the vehicle seat 1 is reduced when the foreign object is entrapped by the seatback 3.

(2) When the seatback 3 is tilted in the same direction as when the entrapment determination unit 28 determined that a foreign object had been entrapped and the entrapment determination unit 28 does not detect entrapment of the foreign object at the entrapment position P1, the speed instruction value setting unit 23 updates the speed instruction value ωd of the entrapment position P1 in the speed instruction map to a higher value. The speed instruction value ωd of the entrapment position P1 is updated to a higher value in this mode several times, and the speed instruction value ωd of the entrapment position P1 is returned to the initial value ωs. Thus, when a foreign object that has been detected as being entrapped is removed, the tilting speed of the seatback 3 at the entrapment position P1 automatically returns to the normal speed (speed based on initial value ωs).

(3) The speed instruction value setting unit 23 updates the speed instruction map so that the speed instruction value ωd for the section (deceleration section ΔPb) located in front of the entrapment position P1 (in the tilting direction that resulted in the entrapment determination) gradually decreases from the initial value ωs as the seatback 3 moves. Thus, the tilting speed of the seatback 3 is controlled to be reduced smoothly. As a result, the vehicle occupant would not sense any awkwardness in the behavior of the seatback 3.

In addition, the speed instruction value setting unit 23 updates the speed instruction map so that the speed instruction value ωd of the section (acceleration section ΔPc) at the rear of the entrapment position P1 gradually increases as the seatback 3 moves. Thus, the tilting speed of the seatback 3 is controlled to be smoothly increased. As a result, the vehicle occupant would not sense any awkwardness in the behavior of the seatback 3.

(4) The speed instruction value setting unit 23 sets a section including the entrapment position P1 and the front and rear of the entrapment position P1 as the warning section ΔPa and changes the speed instruction value ωd of the section ΔPa to the first low speed value ω1, which is smaller than the initial value ωs. Thus, the seatback 3 is tilted at a low speed from a location in front of the entrapment position P1. This further ensures that the tilting speed of the seatback 3 is reduced at the entrapment position P1.

The above embodiment may be modified as described below.

In the above embodiment, if entrapment of a foreign object is not detected in the warning section ΔPa when the seatback 3 is tilted in the same direction after the speed instruction value ωd of the warning section ΔPa was rewritten to the first low speed value ω1, the speed instruction value ωd of the warning section ΔPa is repeatedly updated to a higher value and returned to the initial value ωs. Instead, even if entrapment of a foreign object is not detected in the warning section ΔPa when the seatback 3 is tilted in the same direction after the speed instruction value ωd of the warning section ΔPa was rewritten to the first low speed value ω1, the speed instruction value ωd of the warning section ΔPa may be maintained at the first low speed value ω1. Further, if the number of times when entrapment of a foreign object is not detected in the warning section ΔPa reaches a predetermined number of times, the speed instruction value ωd of the warning section ΔPa may be controlled to be returned to the initial value ωs from the first low speed value ω1.

In the above embodiment, the speed instruction value setting unit 23 sets the section extending from the front to the rear of the entrapment position P1 as the warning section ΔPa and changes the speed instruction value ωd of the warning section ΔPa from the initial value ωs. Instead, only the section in front of the entrapment position P1 (including entrapment position P1) may be set as the warning section ΔPa.

In the above embodiment, the entrapment determination unit 28 makes an entrapment determination based on the speed change amount of the motor M that is calculated from the rotation speed detection value ω of the motor M. Instead, the entrapment determination may be made based on characteristic values of the motor M other than the speed change amount, for example, the speed deviation Aω, the position information P of the seatback 3, the rotation detection signal Sp output from the rotation sensor 13, the voltage instruction value Vd, and the control signal Sc.

In the above embodiment, the speed instruction value ωd of the entrapment position P1, which is where the entrapment determination unit 28 determines that a foreign object has been entrapped, is changed to a value smaller than the initial value ωs. Instead, the threshold value t of the entrapment determination may be changed to a value smaller than a predetermined initial value in a section including the entrapment position P1. One example of this control mode is shown in FIGS. 3A to 3D.

Figure 3A:
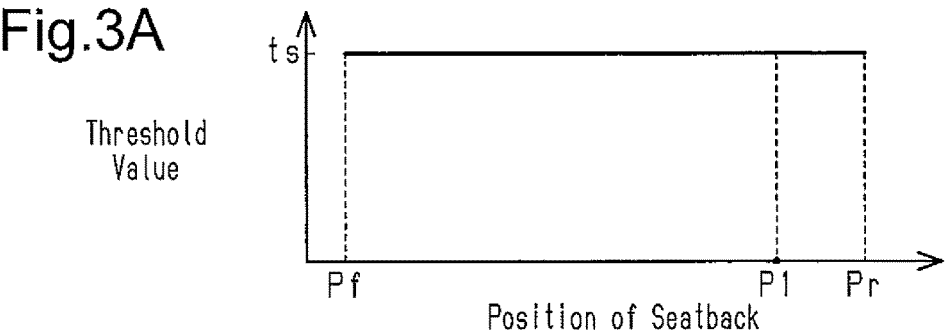
FIGS. 3A to 3D are graphs showing modes for changing a threshold value map in the configuration of FIG. 1.

The threshold value t used for the entrapment determination by the entrapment determination unit 28 is in a map format stored in advance in a memory. FIG. 3A shows an initial state of the threshold value t, which is stored in the memory, in accordance with a position of the seatback 3. In the initial state as shown in FIG. 3A, the threshold value t of the entrapment determination is the same (initial value ts) wherever the seatback 3 is located from the front end position Pf to the rear end position Pr.

For example, when the seatback 3 is tilted to the rear, if the entrapment determination unit 28 makes an entrapment determination based on the threshold value (initial value ts) at a certain position (catching position P1), the control circuit 12 stops driving the drive circuit 11 with the PWM controller 25 to stop the motor M.

Figure 3B:

As shown in FIG. 3B, the entrapment determination unit 28 also rewrites the threshold value t of the warning section ΔPd including the entrapment position P1 from the initial value ts to a first threshold value t1, which is smaller than the initial value ts, based on the entrapment determination. Further, the entrapment determination unit 28 rewrites the threshold value t so that a threshold value decreasing section ΔPe and a threshold value increasing section ΔPg are respectively located at the front of and rear of the warning section ΔPd. In the threshold decreasing section ΔPe, the threshold value t decreases from the initial value ts to the first threshold value t1 as the seatback 3 moves, for example, in correspondence with a linear function. In the threshold value increasing section ΔPg, the threshold value t increases from the first threshold value t1 to the initial value ts as the seatback 3 moves, for example, in correspondence with a linear function.

After the entrapment determination of the entrapment determination unit 28 stops the seatback 3 at the entrapment position P1, the vehicle occupant operates the operation switch SW to tilt the seatback 3 from the entrapment position P1 to the front and then tilt the seatback 3 to the rear again. In this case, when the foreign object still exists in the same state as before, the entrapment determination unit 28 detects the foreign object more sensitively based on the first threshold value t1, which is lower than the initial value ts. This reduces the load applied to the foreign object and the vehicle seat 1 when the foreign object is entrapped by the seatback 3.

Figure 3C:
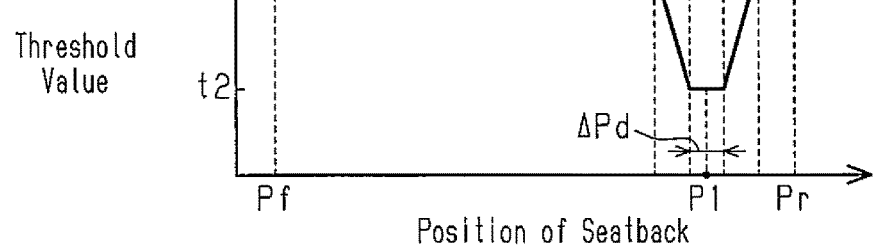

If the foreign object is removed and the operation switch SW is deactivated when the seatback 3 is located at a position closer to the end position Pr than the warning section ΔPd, the entrapment determination unit 28 determines whether entrapment of the foreign object has been detected when the seatback 3 passed through the warning section ΔPd. If it is determined that entrapment of a foreign object has not been detected in the warning section ΔPd, the entrapment determination unit 28 rewrites the threshold value t of the warning section ΔPd from the first threshold value t1 to a second threshold value t2 (t1<t2<ts) as shown in FIG. 3C. The entrapment determination unit 28 accordingly changes the degree of increase and decrease (gradient in the present embodiment) of the threshold value t in the threshold decreasing section ΔPe and the threshold increasing section ΔPg.

Figure 3D:
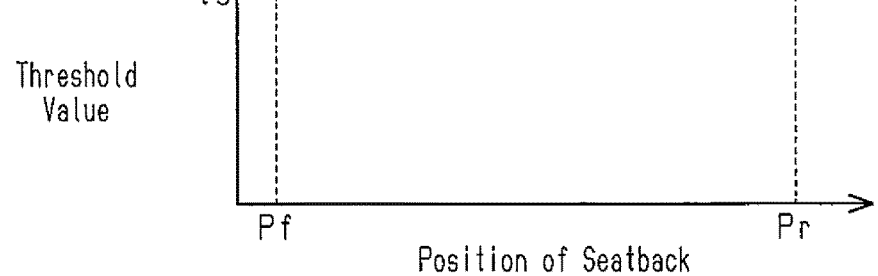

After the threshold value t is updated to a higher value several times (for example, twice) in the warning section ΔPd, the threshold decreasing section ΔPe, and the threshold increasing section ΔPg in the above mode, the threshold value t of each of the sections ΔPd, ΔPe, and ΔPg returns to the initial value ts (refer to FIG. 3D). Thus, when removing a foreign object for which entrapment was detected, the threshold value t of the entrapment determination at the entrapment position P1 automatically returns to the initial value ts.

Further, the entrapment determination unit 28 changes the threshold value t from the initial value ts for the threshold decreasing section ΔPe that is located in front of the warning section ΔPd, which includes the entrapment position P1, so that determination becomes stricter as the vehicle seat 1 moves (i.e., decreases threshold value t). This allows for sensitive detection of a foreign object even in front of the entrapment position P1. In this example, the entrapment determination unit 28 functions as a threshold value changing unit.

In the example of FIG. 3, if entrapment of a foreign object is not detected in the warning section ΔPd when the seatback 3 is tilted in the same direction after the threshold value t of the warning section ΔPd was rewritten to the first threshold value t1, the threshold value t of the warning section ΔPd is repeatedly updated to a higher value and returned to the initial value ts. Instead, even if entrapment of a foreign object is not detected in the warning section ΔPd when the seatback 3 is tilted in the same direction after the threshold value t of the warning section ΔPd was rewritten to the first threshold value t1, the threshold value t of the warning section ΔPd may be maintained at the first threshold value t1. Further, if the number of times when entrapment of a foreign object is not detected in the warning section ΔPd reaches a predetermined number of times, the threshold value t of the warning section ΔPd may be controlled to be returned to the initial value ts from the first threshold value t1.

In the above embodiment, the control circuit 12 stops driving the drive circuit 11 with the PWM controller 25 to stop the motor M based on an entrapment determination of the entrapment determination unit 28. Instead, the drive circuit 11 may be driven to rotate the motor M in the reverse direction by a predetermined amount (or for a predetermined time) based on the entrapment determination.

In the above embodiment, the speed feedback control may be changed to, for example, P control or PID control. In the above embodiment, the present invention is applied to the vehicle seat controller 10 that controls tilting of the seatback 3. Instead, the present invention may be applied to a controller that controls, for example, movement of the seat cushion 2 to the front and rear and height adjustment (lifter operation) of the seat cushion 2.

The invention claimed is:

1. A vehicle seat controller that controls motor-driving of a vehicle seat based on rotation force of a motor, the vehicle seat controller comprising:
    a feedback controller that performs speed feedback control so that a rotation speed of the motor follows a speed instruction value based on a difference of the speed instruction value and an actual speed of the rotation speed of the motor;
    a speed instruction value setting unit that sets the speed instruction value in accordance with a position of the vehicle seat; and
    an entrapment determination unit that determines entrapment of a foreign object entrapped by the vehicle seat when the vehicle seat is motor-driven,
    wherein when the entrapment determination unit makes a foreign object entrapment determination, the speed instruction value setting unit changes the speed instruction value for an entrapment position of the vehicle seat to a low speed value that is smaller than a predetermined initial value.

2. The vehicle seat controller according to claim 1, wherein if the vehicle seat is moved in a direction that is the same as when the entrapment determination was made and the entrapment determination unit does not detect entrapment of a foreign object at the entrapment position, the speed instruction value setting unit returns the speed instruction value of the entrapment position to the initial value.

3. The vehicle seat controller according to claim 1, wherein the speed instruction value setting unit changes the speed instruction value, from the initial value, for a section located in front of the entrapment position of the vehicle seat so that the speed instruction value gradually decreases as the vehicle seat moves.

4. A vehicle seat controller that controls motor-driving of a vehicle seat based on rotation force of a motor, the vehicle seat controller comprising:
    a feedback controller that performs speed feedback control so that a rotation speed of the motor follows a speed instruction value based on a difference of the speed instruction value and an actual speed of the rotation speed of the motor;
    an entrapment determination unit that determines entrapment of a foreign object entrapped by the vehicle seat when the vehicle seat is motor-driven based on a threshold value; and
    a threshold value changing unit that changes the threshold value to make a stricter determination than when using a predetermined initial value for a section including an entrapment position of the vehicle seat where the entrapment determination unit made a foreign object entrapment determination.

5. The vehicle seat controller according to claim 4, wherein if the vehicle seat is moved in a direction that is the same as when the entrapment determination was made and the entrapment determination unit does not detect entrapment of a foreign object at the entrapment position, the threshold value changing unit returns the threshold value of the entrapment position to the initial value.

6. The vehicle seat controller according to claim 4, wherein the threshold value changing unit changes the threshold value for a section located in front of the section including the entrapment position of the vehicle seat from the initial value so that determination gradually becomes stricter as the vehicle seat moves.

* * * * *

UNITED STATES PATENT AND TRADEMARK OFFICE
CERTIFICATE OF CORRECTION

| | |
|---|---|
| PATENT NO. | : 9,616,774 B2 |
| APPLICATION NO. | : 14/975417 |
| DATED | : April 11, 2017 |
| INVENTOR(S) | : Hirotaka Itou |

It is certified that error appears in the above-identified patent and that said Letters Patent is hereby corrected as shown below:

On the Title Page

Item (72), after the inventor's name, please delete "Toyohashi (JP)" and insert therefor -- Toyohashi-shi (JP) --.

Signed and Sealed this
Twenty-third Day of May, 2017

Michelle K. Lee
*Director of the United States Patent and Trademark Office*